US008383218B2

(12) United States Patent
Schwitter et al.

(10) Patent No.: US 8,383,218 B2
(45) Date of Patent: Feb. 26, 2013

(54) MULTILAYER COMPOSITE IN FORM OF EXTRUDED HOLLOW SECTIONS

(75) Inventors: Paul Schwitter, Schaenis (CH); Ralph Kettl, Paspels (CH); Thomas Uebele, Cazis (CH); Botho Hoffamnn, Domat/Ems (CH); Carsten Gottschalk, Domat/Ems (CH); Werner Kaegi, Domat/Ems (CH)

(73) Assignee: EMS-Patent AG, Domat/Ems (CH)

( * ) Notice: Subject to any disclaimer, the term of this patent is extended or adjusted under 35 U.S.C. 154(b) by 108 days.

(21) Appl. No.: 11/831,289

(22) Filed: Jul. 31, 2007

(65) Prior Publication Data

US 2008/0057246 A1 Mar. 6, 2008

(30) Foreign Application Priority Data

Jul. 31, 2006 (EP) .................... 06015922

(51) Int. Cl.
- B32B 1/08 (2006.01)
- B05D 1/36 (2006.01)
- F16L 11/04 (2006.01)
- F16L 9/14 (2006.01)
- B62D 49/06 (2006.01)
- B29C 47/06 (2006.01)

(52) U.S. Cl. ............... 428/36.6; 427/407.1; 138/137; 138/141; 180/313; 264/539

(58) Field of Classification Search ............ 428/36.6; 138/137, 141; 180/407.1, 313; 427/407.1; 264/539

See application file for complete search history.

(56) References Cited

U.S. PATENT DOCUMENTS

| 5,284,184 | A | * | 2/1994 | Noone et al. ............ 138/121 |
| 5,960,977 | A | | 10/1999 | Ostrander et al. |
| 6,162,244 | A | * | 12/2000 | Braun et al. ............ 623/1.12 |
| 6,555,243 | B2 | * | 4/2003 | Flepp et al. ............ 428/474.4 |

| 2002/0012806 | A1 | | 1/2002 | Flepp et al. |
| 2005/0025920 | A1 | * | 2/2005 | Stolarz et al. ............ 428/35.7 |

FOREIGN PATENT DOCUMENTS

| CH | 655 941 | A | * | 5/1986 |
| DE | 35 10 395 | A1 | | 9/1986 |
| DE | 698 31 239 | B1 | | 2/2006 |
| DE | 698 31 239 | T2 | | 2/2006 |
| EP | 1 559 537 | A2 | | 8/2005 |
| EP | 0 710 537 | A2 | | 5/2006 |
| WO | 2006/010736 | A | | 2/2006 |

OTHER PUBLICATIONS

Machine translation of EP 0 922 731, Jun. 1999.*
Machine Translation for CH 655 941A (May 1986).*
European Search Report in EP 1 559 537 A1 (EP 06015922.5), Sep. 2006.

* cited by examiner

Primary Examiner — Erik Kashnikow
(74) Attorney, Agent, or Firm — Sughrue Mion, PLLC

(57) ABSTRACT

Multi-layer composites, particularly thermoplastic composites, in form of an extruded hollow section, e.g. tubes or hoses for liquid fuel lines, include a thermoplastic outer layer and at least one further layer, wherein the outer layer is formed by a mixture based on (A) 80 to 20 parts by weight of at least one polyamide (PA) and (B) 20 to 80 parts by weight of at least one polyamide elastomer (TPE-A), of polyether amides, polyester amides, polyether ester amides, polyether ester ether amides or mixtures thereof, wherein the sum of (A) and (B) is 100 parts by weight, the hollow section being produced at extrusion speeds, of over 20 m/min, so that the produced hollow section has an elongation at break, of over 200%, wherein the elongation at break has been measured at the finished hollow section according to DIN EN ISO 527-2.

30 Claims, No Drawings

MULTILAYER COMPOSITE IN FORM OF EXTRUDED HOLLOW SECTIONS

FIELD OF THE INVENTION

The present patent application claims priority of European patent application EP 06 015 922.5 and relates to modified polyamide (PA) extrusion molding materials modified with polyamide elastomers (TPE-A) for the improvement of the elongation at break of the extruded article at higher extrusion speed. The invention further relates to multi-layer composites, in particular to thermoplastic multi-layer composites, in form of hollow sections, preferably for the automotive sector, comprising at least one outer layer made from these molding materials as well as at least a further layer, preferably a barrier layer and optionally further layers. The present invention relates also to a method for the production of said hollow sections, which may especially exist in the form of tubes, pipes or hoses, preferably for the automotive sector, more preferably as fuel tube or pipe for liquid fuels such as gasoline or diesel or for alternative fuels like e.g. bio ethanol (and appropriate fuel mixtures) or rape methyl esters.

BACKGROUND

Conversion operations and in particular extrusion methods for plastics are for a long time state of the art and are e.g. described in the book: W. Michaeli, Einführung in die Kunststoffverarbeitung, 4. Edition 1999, Carl Hanser Verlag Munich, page 85 ff. In FIG. 6.1.1 on page 85 the conceptional diagram of a tube extrusion apparatus is described. With extrusion speed the speed of the caterpillar take-off and the speed of the prepared hollow section transported thereby is meant, respectively, thus the production speed of the extrusion apparatus.

During the production of multi-layer tubes or hoses having a polyamide outer layer by means of extrusion it was found that the mechanical characteristics, like elongation at break and cold impact strength, are worsening, if the extrusion equipment is operated with higher speed (starting from 20 m/min, increasing to e.g. 60 to 80 m/min or higher). In the present connection, the drawdown speed of the caterpillar take-off after the cooling line and the calibration (which may be accomplished e.g. by means of water cooling) is meant with the extrusion speed. In addition, it is to be noticed that when operating the apparatus at a higher extrusion speed also the material output of the extruder must be of course adjusted proportionally higher at the same time, because even on the higher speed level a certain article with the same cross section and the same wall thickness and to the same diameter respectively shall still result. Thus, during the evaluation of the mechanical characteristics in the present case extruded articles of the same geometry are respectively compared.

The above specified effect, that at higher extrusion speeds the mechanical characteristics of the manufactured articles are worsening, is already known to experts for a long time and represents a disadvantage, because the extrusion speed is limited thereby. The critical point of the multi-layer tube is namely the outer surface, i.e. the surface section of the tube, which cools down most quickly from the outer and which orients itself more distinctly at higher speed. Consequently, due to the higher tension in the outer surface and the smaller elasticity when mechanically loaded, respectively, it begins to break earlier. The effect mentioned above is described by e.g. A. Carin et al. in Intern. Polymer Processing XX (2005), pages 305-311. Here one finds on page 310 the well-known relation that the orientation of the outer surface increases with increasing drawdown speed, i.e. the elongation at break decreases vice versa.

According to EP 0 245 125 B1, it has been tried to get the orientation in the outer surface to disappear by a complicated and not completely harmless subsequent treatment method i.e. by means of flaming calibrated tubes with following renewed cooling.

EP 1 452 307 A1 describes multi-layer automotive tubes, which are resistant to peroxide containing gasoline and which also comply to the usual requirements regarding cold impact and which have a simple and economical structure. The multi-layer tube is formed with an inner layer based on a mixture of polyamide homopolymers, and it additionally has a compatibilizer. The characteristic feature of EP 1 452 307 A1 is the fact that the inner layer is not formed based on only one polyamide homopolymer or based on a mixture of polyamide 6 copolymers, but from a blend of different non-mixable polyamide homopolymers, using a compatibilizer. If this blend is also used for the outer layer of a multi-layer line, as provided in EP 1,452,307 A1, the above mentioned effect also arises, that with increasing extrusion speed the elongation at break of the multi-layer tube is reduced.

GB 2 390 658 B describes multi-layer polymer tube or hose lines with an ethylene/vinyl alcohol copolymer (abbreviated EVAL or, in the English-speaking world, also designated as EVOH) barrier layer as well as with an outer layer of polyamide 612 or polyamide 610 and an inner layer of polyamide 6, polyamide 612 or polyamide 610. These above mentioned materials have a very good dimensional stability under heat and good barrier characteristics against hydrocarbons and have additionally good adhesion between the layers, i.e. the multi-layer tube is resistant against delamination. But even with these multi-layer tubes the well-known effect arises that the elongation at break is reduced at increasing extrusion speed.

DE 698 31 239 T2 describes multilayered structures based on polyamides, in particular tubes with multilayered structure, wherein at least one inner layer and at least one outer layer are provided. The outer layer is formed from a mixture of at least one copolyamide of the type 6/6-36 and at least a second thermoplastic polymer, i.e. of the type polyamide 6. The second polymer does not contain plasticizers or elastomers.

EP-A-1 559 537 describes a multilayered plastic tube with barrier characteristics for automobiles. The plastic of the substrate may consist of a blend of polyamides. Further, a barrier layer made of EVOH is provided. The outer layer of the multilayered fuel tube can additionally have a jacket by an outer protective layer, which consists of a thermoplastic elastomer (TP) and a thermoplastic polyurethane (TPU), respectively. This additional protective layer can be coextruded with the other layers and thereby becomes a component of the composite composite.

US 2002/0012806 A1 describes thermoplastic multilayered structures, which include inner layers made from polyamides or polyamide mixtures. The polymer mixtures can contain usual polyamide types without plasticizers.

EP 0 710 537 A2 describes a multilayered line or conduit, wherein the inner layer consists of polyamides and which outer layer consists of polyamides having a layer of EVOH disposed between. The mixtures of the layer materials do not contain plasticizers and/or polyamide elastomers.

DE 35 10 395 A1 describes multi-layer fuel tubes or hose lines with an alcohol barrier layer based on polyvinyl alcohol. In the direction to the inner flow channel a polyamide protective layer made of polyamide 11 or 12 is provided.

U.S. Pat. No. 5,960,977 A1 describes polymer hoses or tubes with corrugated segments.

Use of elastomer modified polymers has further become known in other areas of the state of the art e.g. in medical technology or with fiber-optic cables. DE 3 724 997 C2 describes the use of polyamide/polyamide elastomer mixtures in the production of polymer protective layers of fiber-optic cables. The coating of fiber-optic cables with a layer of polyamide/polyamide elastomer mixtures is accomplished according to DE 3 724 997 C2 using the extrusion method.

EP 0 566 755 B 1 further describes polyether amide hoses for medical instruments, which are extruded from a mixture of two polymers, of which one polymer is a polyether amide and the other one is a polyether ester amide or a polyamide.

DE 2 716 004 C3 describes mixable polyether ester amides based on laurinlactam with polyamide 12 for the production of flexible, cool impact mono tubes.

In DE 3 724 997 C2 and DE 2 716 004 C3 as well as in EP 0 566 755 B1 polyether amides with laurinlactam are used as monomer for the polyamide block. Appropriate modified mixtures with polyamide 12 are also mentioned in the book: Polyamid-Kunststoffhandbuch, 3/4, 1998, Carl Hanser Verlag, page 872, paragraph 8.3.3. These blends are showing a partial compatibility, which is based on the cocrystallization of the polyamide 12 blocks with the homopolyamide. In the three corresponding patents neither multi-layer conduits nor the compatibilization are mentioned. However, such a mixture would not adhere on barrier materials, in particular not on EVOH. Polyamides which cause adhesion to EVOH, are described for example in the EP 1 162 061 B1.

DE 3 916 001 A1 describes a four-component mixture of amorphous copolyamides, block polyether polyamides, block polyether ester polyamides and modified copolyolefines. The disadvantage of such mixtures, which contain amorphous copolyamides, is the lower resistance to chemicals, especially to zinc chloride, which must be achieved for fuel lines.

SUMMARY OF THE INVENTION

Therefore, it is an object of the present invention to provide a thermoplastic multi-layer composite, which is improved with regard to the layer adhesion and the resistance regarding resistance to chemicals, permeation as well as resistance to elution, wherein even at higher extrusion speeds only small tensions in the outer surface are to be found, e.g. the mechanical characteristics are not impaired, and the economy of the tubing production can be substantially increased.

The inventors have now surprisingly found during extrusion experiments of multi-layer tubes, particularly with barrier layers, as e.g. from EVOH (ethylene vinyl alcohol copolymers), that the effect of impairment of the mechanical characteristics in the outer surface can be inverted in a completely unexpected way, if one adds a certain portion of polyamide elastomer to the polyamide molding material provided for the outer layer, in particular if the polyamide elastomer is not mixable with the polyamide.

Therefore, the invention relates to new multi-layer composites, especially to thermoplastic multi-layer composites, in form of an extruded hollow section, comprising a thermoplastic outer layer and at least one further layer, wherein the outer layer is formed of a mixture based on (A) 80 to 20 parts by weight of at least one polyamide (PA) and (B) 20 to 80 parts by weight of at least one polyamide elastomer (TPE-A), the latter from the group of the polyether amides, the polyester amides, the polyether ester amides, the polyether ester ether amides and mixtures thereof, wherein the sum of (A) and (B) results in 100 parts by weight. The hollow sections with such an outer layer manufactured at higher extrusion speed (particularly over 20 m/min) showing a higher elongation at break, compared to an otherwise identical hollow section, manufactured at lower extrusion speed, as well as particularly also compared with a hollow section with a polyamide outer layer without polyamide elastomer additive, manufactured at the same extrusion speed, wherein the elongation at break is determined on the finished hollow section according to DIN EN ISO 527-2. In other words this means that faster produced multi-layer tubes with an outer layer according to the invention exhibit a higher elongation at break compared with multi-layer tubes manufactured at lower extrusion speeds.

DETAILED DESCRIPTION

If one adds a PA elastomer portion (TPE-A) to the outer layer material, i.e. a polyamide (PA), e.g. 50 parts by weight, related to 100 parts by weight from the sum of PA and TPE-A, already at 20 m/min extrusion speed the elongation at break $\epsilon_R$ begins to reach a value of over 200%, in contrast to a multi-layer composite with polyamide outer layer without (TPE-A)-additive and even increases at higher speed (see experiments of table 4 with 40 m/min and 60 m/min), which is particularly amazing. The definition of the elongation at break $\epsilon_R$ is well-known to a skilled person and can be found e.g. in the book: Kunststoff-Kompendium, 2. Edition, VOGEL Buchverlag Würzburg, 1988, page 239 among the characteristic values.

Thus, both the quality and the productivity of the extrusion of the multi-layer composites, in particular of multi-layer tubes, can be enormously increased according to the invention.

As polyamide (PA) for the component (A) favorably polycondensation products of aliphatic lactams or ω-aminocarboxylic acids with 4 to 44 carbon atoms, preferably 4 to 18 carbon atoms, or such from aromatic aminocarboxylic acids with 6 to 20 carbon atoms are used.

Likewise suitably are polycondensation products from at least one diamine and at least one dicarboxylic acid with 2 to 44 carbon atoms, respectively. Examples of such diamines are ethylene diamine, 1,4-diamino butane, 1,6-diamino hexane, 1,10-diamino decane, 1,12-diamino dodecane, m- and p-xylylene diamine, cyclohexyl dimethylene amine, bis-(aminocyclohexyle)methane and its alkyl derivatives.

Examples of dicarboxylic acids are succinic, glutaric, adipic, pimelic, suberic, azelaic and sebacic acid, dodecanic diacid, dimer fatty acids with 36 or 44 C-atoms, 1,6-cyclohexane dicarboxylic acid, terephthalic acid, isophthalic acid and naphthalene dicarboxylic acid.

Especially preferred polyamides (PA) for component (A) are homo- and copolyamides based on PA6, PA11, PA46, PA12, PA1212, PA1012, PA610, PA612, PA69, PA6T, PA6I, PA10T, PA12T, PA12I, their mixtures or copolymers based on these polyamides, wherein PA11, PA12, PA1212, PA10T, PA12T are preferred. Also preferred are copolymers based on the above mentioned polyamides, like e.g. 12T/12, 10T/12, 12T/106 and 10T/106. Further, also polyamide 6/66, polyamide 6/612, polyamide 6/66/610, polyamide 6/66/12, polyamide 6/6T and polyamide 6/61 can be used according to the invention.

Preferred amorphous or micro-crystalline homo- and copolyamides have the following compositions: PA 61, PA 61/6T, PA MXDI/61, PA MXDI/MXDT/61/6T, PA MXDI/121, PA MAC-MI/12, PA MACMI/MACMT/12, PA 61/MACMI/12, PA 61/6T/MACMI/MACMT/12, PA PACM6/11, PA PACM12, PA PACMI/PACM12, PA MACM6/11, PA MACM12, PA MACMI/MACM12, PA MACM12/PACM12, PA 61/6T/PACMI/PACMT/PACM12/612.

Especially preferred polyamides for component (A) are PA6, PA11, PA12, PA610, PA612, PA1010, PA1012 and PA1212 or mixtures thereof.

The polyamide elastomers (TPE-A) for component (B) can be prepared by insertion of flexible polyester, polyether or polyolefin segments in polyamide block polymers. The general structure is described in the book: Polyamid-Kunststoffhandbuch 3/4, Carl Hanser Verlag, Munich 1998, pages 854 and 855.

Polyester amides, as they are described in EP-A-0 069 475, are prepared from ester-forming monomers and amide-forming monomers. From WO 85/02852 it could be taken that Polyester amides are prepared by reaction of a polyamide block with carboxyl groups at both chain ends and a polycaprolactonediol. EP 0 955 326 B1 relates to polyamides which are modified with dimerdiol and dimerdiol containing hydroxyl terminated polyester. The latter polyester amides are characterized by an excellent resistance to hydrolysis compared with other diol comprising polyamides.

The preparation of polyether amides is described for example in EP 0 459 862 B1 and CH 642 982. The polyether amides are thereby prepared starting from polyamide sequences, which have carboxyl groups at both chain ends, with polyoxyalkylene sequences, which have amino groups at both chain ends.

JP 592 079 30 A describes the preparation of polyester ether amides, wherein the synthesis is carried out via cocondensation from polyamide blocks (e.g. PA 610 or PA 612), which have carboxyl groups at both chain ends, with polyether blocks, which are based on polyalkyleneoxide polyoles.

Further examples of usable TPE-A according to the present invention can be found in the book: Polyamid Kunststoffhandbuch, 3/4, 1998, Carl Hanser Verlag, pages 854-871.

Block copolyether ester ether amides, as mentioned in EP 0 399 415 B1 and U.S. Pat. No. 5,574,128, respectively, are combinations of polyether amides and polyether ester amides. The synthesis takes place thereby via cocondensation from polyamide blocks, which have carboxyl groups at both chain ends, with both polyether dioles and polyether diamines.

For component (B) polyamide elastomers (TPE-A) from the sub-groups of the polyether amides, the polyether ester amides and the block copolyether ester ether amides are preferred. These TPE-A are prepared from polyether blocks with reactive terminal groups, which are suitable for the formation of ester and/or amide bonds (hydroxyl and/or amino terminal groups are preferred). The polyether backbone may consist of polypropylene glycol (PPG), polytetramethyl glycol (PTMEG), polybutylene glycol (PBG), polyethylene glycol (PEG), Polyneopentyl glycol (PNPG) and/or their mixtures and/or their copolymers and/or their block polymers.

Commercial products of typical polyether amides or of polyether ester amides are to be found in the book: Polyamid Kunststoffhandbuch, 3/4, 1998, Carl Hanser Verlag, page 875. Exemplary materials are the products Grilon® ELX or Grilamid® ELY obtainable from EMS-Chemie AG, Domat/Ems, Switzerland. Grilon® ELX is a polyether amide with polyamide 6 hard blocks. The product Grilamid® ELY is a polyether amide with polyamide 12 hard blocks.

According to a particularly preferred embodiment of the invention a blend of polyamide 12 (component A) with a polyamide 6 polyether amide (component B) as well as an impact modifier, which acts as a compatibilizer, is used as material for the outer layer. As alternative preferred variants a polyamide 12 with a polyamide 12 polyether amide or alternatively a polyamide 6 with a polyamide 12 polyether amide and optionally an impact modifier, which also can act as a compatibilizer, or a polyamide 6 with a polyamide 6 polyether amide, or mixtures thereof are used as mixture for the outer layer.

The polyamide extrusion molding material according to the invention preferably comprises an impact modifier, which can act as a compatibilizer, wherein it is present in a portion within the range of from 0 to 35 wt.-%, referred to the weight of the total molding material. Especially favorable is a portion from 5 to 35 wt.-%, especially preferred a portion from 8 to 30 wt.-%, particularly preferred from 12 to 25 wt.-%. Elastomers or rubbers are suitable as impact modifiers. Such rubbers are amongst others described in EP 0 654 505 A1, from page 4, line 38, to page 5, line 58, and they are well-know to a person skilled in the art due to this detailed listing. Such impact modifiers share that they comprise elastomers and have at least a functional group which can react with the polyamide, for example a carboxylic acid or carboxylic acid anhydride group.

The preparation of impact modifiers takes place by means of grafting or copolymerising of the parent polymers with suitable reactive compounds such as maleic acid anhydride, (meth)acrylic acid or glycidyl(meth)acrylate. Therefore, impact modifiers can often be paraphrased as grafted copolyolefines. Also mixtures of different impact modifiers can be used.

Impact modifiers can naturally also be comprised in the molding material of an inner layer which is based on polyamide. Preferred inner layer materials are corresponding to the inner layers of the already mentioned EP 1 452 307 A1 or GB 2 390 658 B.

Additionally, flame retardants, pigments, stabilizers, reinforcements (e.g. glass fibers), plasticizers, mineral fillers such as kaolin or clay minerals (layer silicates), or particularly for the internal layer also additives to ensure electrical conductivity, i.e. antistatic additives (e.g. conductive carbon black or carbon fibers or graphite fibrils and carbon nanotubes, respectively) are suitable as further additives for the inner and/or outer layer. However, these additives are preferably not more than 50 wt.-% of the entire molding material, wherein flame retardants can amount up to 15 wt.-%. In preferred embodiments the inner and/or outer layer comprises a plasticizer in a portion from 5 to 20 wt.-%, especially preferred in a portion from 10 to 15 wt.-%, related to the weight of the total molding material.

An intermediate layer based on ethylene vinyl alcohol copolymer (EVOH) can be preferably used as a barrier layer on the inside of the outer layer according to the invention and/or between the outer and an optional inner layer. Additionally, it is also possible to use barrier layers based on fluoro polymers or copolymers of fluoro polymers, polyphenylene sulfides, partly aromatic polyesters like e.g. PBT or PEN, partly aromatic polyamides, such as polyphthalamides or polyamides based on MXDA, liquid-crystalline polymers (LCP), metal foils, metal tubes or other barrier materials known to a person skilled in the art. These barrier layers may optionally be present with each other in different layers of the multi-layer composite. Naturally, the multi-layer composite can also comprise still further intermediate layers, e.g. adhesion mediator layers.

All mentioned polymers or metals, which are suitable for the barrier layer, are rather rigid materials, why it is particularly preferred to obtain a multi-layer composite with good composite adhesion between the individual layers, which has a high elongation at break in its total combination for the further processing steps after the extrusion process, in particular for the thermal form process.

In a particularly preferred embodiment the barrier layer is based on ethylene vinyl alcohol copolymers (EVOH). In a further preferred embodiment it is possible to let the optional inner layer abut directly on the barrier layer. Polyamides, which are suitable for the optional inner layer, are such, as already mentioned in the description of component (A). Polyamide or polymer mixtures are preferred which have inherent adhesion characteristics to the particularly preferred embodiment with a barrier layer of EVOH, as described in EP 1 452 307 A1 or EP 1 162 061 B1. More preferred polyamides are PA 6, PA 66, PA 610, PA 612 and mixtures thereof, and/or according to EP 1 452 307 A1 a mixture of PA 6, PA 12 and a compatibilizer. Most preferably the inner layer is formed of polyamide 610 or polyamide 612 or a mixture made of polyamide 610 and polyamide 6 and/or polyamide elastomers with polyamide 6 hard segments.

In case of a barrier layer based on ethylene vinyl alcohol copolymers (EVOH) the barrier layer preferably comprises at least 80 wt.-% ethylene vinyl alcohol copolymers (EVOH). To increase the stress crack stability for extreme strains it is advantageous, if the barrier layer based on ethylene vinyl alcohol copolymers (EVOH) comprises up to 20 wt.-% flexibilizing polymers, preferably copolyamide 6/12 and/or ethylene vinyl acetate copolymer (EVA).

It is also possible to provide further layers between the inner layer and/or the barrier layer. Such a further intermediate layer between the inner layer and a barrier layer preferably formed of ethylene vinyl alcohol copolymers can preferably consist of a material based on polyamide 6, based on copolymers like e.g. copolyamide 6/12, or based on a polyolefin, which is preferably functionalized, or mixtures thereof. Further, an additional intermediate layer between the barrier layer, preferably consisting of ethylene vinyl alcohol copolymers, and the polyamide blend used as outer layer can be provided, said additional intermediate layer is selected from the same group of polymers as the optional internal intermediate layer.

According to a particularly preferred embodiment the barrier layer abuts directly on the outer layer. If the optional inner layer additionally abuts directly on the barrier layer, a particularly economical three-layer structure can be obtained, as already mentioned above.

A further preferred embodiment of the invention is characterized in, that the optional inner layer or directly the barrier layer comprises electrically conductive additives. In addition, it is possible to provide a still further most internal layer at the internal layer, made from materials with electrically conductive additives. For example carbon fibers or conductive carbon black, carbon black, graphite fibers, carbon nanotubes, metallic powder or fibers can be used as electrically conductive additives. Such additives are well-known to a person skilled in the art, in addition to the quantities, in which they are used.

All possibly present layers of the multi-layer structure may have portions of further additives, such as plasticizers, pigments, impact modifiers (as already described above), heat and light stabilizers, reinforcements, compatibilizers, or mixtures thereof.

Further, additives may be provided, which reduce permeation, like e.g. nano-fillers (layer silicates) or other mineral fillers.

Typically, the multi-layer composite in form of a hollow section according to the invention, as for example a fuel tube, has an outer diameter of 8 mm and a wall thickness of approx. 1 mm, the inner layer has a thickness within the range of 0.25 to 0.45 mm, the barrier layer of preferably EVOH has a thickness within the range of 0.10 to 0.3 mm and the outer layer has a thickness within the range of 0.65 to 0.35 mm. The hollow section may at least in sections be corrugated and formed as a corrugated tube, respectively.

Further, the present invention concerns a method for the production of a multilayered hollow section, particularly a thermoplastic multi-layer composite, as described above. Thereby, the optional inner layer, the barrier layer and the outer layer and optionally further intermediate layers between the barrier layer and the outer layer and/or the optional inner layer are joined during a preferably continuous process, more preferably to a tube and/or to a line, wherein optionally corrugations are additionally applied, optionally followed by a thermal shaping step. Therein, methods can be used such as coextrusion, coating, tandem extrusion or similar methods.

The multi-layer tubes or hoses according to the invention can be used in the automotive sector as e.g. fuel tubes, brake air lines, compressed air lines, hydraulic lines, clutch lines and cooling lines.

The invention will now be described in more detail based on the following examples, but without limiting same.

EXAMPLES AND COMPARATIVE EXAMPLES

TABLE 1

Used polyamide and polyamide elastomers

| Type of polyamide | description |
|---|---|
| Grilamid ® L25*) | very viscous polyamide 12 |
| Grilamid ® L16*) | medium viscous polyamide 12 |
| Grilon ® F34*) | medium viscous polyamide 6 |
| Grilon ® XE 3871*) | polyether amide with PA 6 hard blocks |
| Grilamid ® XE 3908*) | medium viscous PA612 |
| Grilamid ® XE 1306*) | medium viscous PA610 |
| Grilamid ® XE 3928*) | medium viscous PA610 |

*)Commercial products of the company EMS-CHEMIE AG, Domat/EMS, Switzerland

Used materials:
Polyamides and Polyamide Elastomers:
The polyamides have been prepared by methods known to a person skilled in the art.
Ethylene Vinyl Alcohol Copolymer (EVOH):
Ethylene vinyl alcohol copolymer (EVOH) was used as material for the barrier layer. In the illustrative embodiments it is a product of the company KURARAY, which is available under the name EVAL® under the product identification F101A and has an ethylene content of 32 mol %. It is available in Europe at the company EVAL Europe N.V. in Zwijindrecht, Belgium.
Impact Modifier:
According to the invention a special acid-modified ethylene/α-olefine copolymer, namely an ethylene propylene copolymer grafted with maleic acid anhydride, was used as impact modifier, which can simultaneous act as a compatibilizer. Its MVR value (measured at 275° C./5 kg) was at 13 cm$^3$/10 min, and its DSC melting point was at 55° C.
Plasticizer:
BBSA (n-butyl benzene sulfonamide) was used as plasticizer.
Stabilizers:
Irganox 245: Commercial product of the company Ciba Speciality chemicals, Basel, Switzerland: Triethyleneglycol bis(3-(3'-tert-butyl-4'-hydroxy-5'-methylphenyl) propionate Hostanox® PAR24: Commercial product of the company Clariant, Basel, Switzerland: Tris(2,4-di-tert-butylphenyl) phosphate.

Conductivity Additives:

A master batch based of polyamide 12 with 30 wt.-% carbon nano-tube was used as conductivity additive. This product is a commercial product of the company Hyperion Catalysis Inc.

The molding materials indicated in the following table 2 for the outer layer were manufactured at temperatures between 240 and 300° C. on a two screw kneading machine ZSK30 of the company Werner und Pfleiderer. Polymers, impact modifier, plasticizers and stabilizers were charged into the feeder of the extruder. In each case a mixture of Irganox® 245 with 0.7 wt.-% and Hostanox® PAR24 with 0.3 wt.-%, related to 100 wt.-% compound (total molding material) were used as stabilizers.

TABLE 2

Molding materials for the outer layer

| components | unit | FE8072 | Z6509 | Z7844 | Z8262 | Z8263 |
|---|---|---|---|---|---|---|
| Grilamid L25 | wt.-% | 42 | 42.5 | 39.5 | 39.125 | — |
| Grilamid L16 | wt.-% | — | — | — | — | 39.125 |
| Grilon F34 | wt.-% | 42 | 42.5 | — | — | — |
| Grilon XE 3871 | wt.-% | — | — | 39.5 | 39.125 | 39.125 |
| Impact modifier | wt.-% | 15 | 15 | 20 | 20 | 20 |
| Stabilizer mixture | wt.-% | 1 | — | 1 | 1 | 1 |
| Black master batch | wt.-% | — | — | — | 0.75 | 0.75 |

The molding materials (inner layer), indicated in the following table 3, were manufactured at temperatures between 240 and 300° C. on a two screw kneading machine ZSK25 of the company Werner und Pfleiderer. Polymers, compatibilizer, plasticizers and stabilizers were charged into the feeder of the extruder.

TABLE 3

Non-antistatic molding materials for the inner layer

| components | unit | W6994 | Z7837 | Z7838 | Z7839 | Z7873 | Z8312 | W9874 |
|---|---|---|---|---|---|---|---|---|
| Grilamid L25 | wt.-% | — | — | — | — | 39 | — | — |
| Grilamid XE 1306 | wt.-% | — | — | — | — | — | 69.5 | 58.5 |
| Grilamid XE 3928 | wt.-% | — | 83 | 90 | — | — | — | — |
| Grilamid XE 3908 | wt.-% | — | — | — | 90 | — | — | — |
| Grilon F34 | wt.-% | 83 | — | — | — | 39 | — | 5 |
| Grilamid XE 3871 | wt.-% | — | — | — | — | — | — | 5 |
| impact modifier | wt.-% | 10 | 10 | 10 | 10 | 15 | 20 | 20 |
| plasticizer | wt.-% | 7 | 7 | — | — | 6 | 10 | 11 |
| stabilizer | wt.-% | — | — | — | — | 1 | 0.5 | 0.5 |

The antistatic molding materials (inner layer), indicated in the following table 4, were manufactured at temperatures between 240 and 300° C. on a two screw kneading machine ZSK25 of the company Werner and Pfleiderer. Polymers, compatibilizers, carbon nanotube masterbatch, plasticizers and stabilizers were charged into the introduction of the extruder.

TABLE 4 antistatic molding materials for the inner layer

| components | unit | PA6/PA12 ESD | PA610 W ESD |
|---|---|---|---|
| Grilamid L25 | wt.-% | 27.5 | — |
| Grilon F34 | wt.-% | 27.5 | — |
| Grilamid XE 3928 | wt.-% | — | 48 |
| plasticizer | wt.-% | — | 7 |
| compatibilizer | wt.-% | 15 | 15 |
| conductivity additive | wt.-% | 30 | 30 |

Tubes and lines, respectively, according to the layer structures described in table 5 were manufactured in a coextrusion process on a usual tube extrusion apparatus, wherein the individual layers were extruded essentially at the same time as a multi-layer composite. The coextrusion process becomes particularly simple if the line exhibits only three layers.

In the following table 5 the layer structures B1-B9 according to the invention, as well as the layer structures serving as comparative examples according to the state of the art) VB1-VB4 are shown:

TABLE 5

Layer structures
Pipes 8 * 1 mm (8 mm outer diameter, 1 mm wall thickness)

| | inner layer | intermediate layer | barrier layer | outer layer |
|---|---|---|---|---|
| VB1 | Z7873 | — | EVOH | FE8072 |
| VB2 | W6994 | — | EVOH | Z6509 |
| VB3 | Z6509 | — | EVOH | Z6509 |
| VB4 | PA6/PA12 ESD | W6994 | EVOH | Z6509 |
| B1 | Z7873 | — | EVOH | Z7844 |
| B2 | Z7837 | — | EVOH | Z6509 |
| B3 | Z7838 | — | EVOH | Z6509 |
| B4 | Z7839 | — | EVOH | Z6509 |
| B5 | PA610 W ESD | W6994 | EVOH | Z6509 |
| B6 | PA610 W ESD | Z7838 | EVOH | Z6509 |
| B7 | Z8312 | — | EVOH | Z8262 |
| B8 | Z8312 | — | EVOH | Z8263 |
| B9 | W9874 | — | EVOH | Z8263 |

The described tubing assemblies B1 and VB1 were manufactured by the coextrusion process at different withdrawal speeds (extrusion speeds) and appropriate material throughputs. The elongation at break was determined at the manufactured multi-layer tubes according to the following specification: Elongation at break according to DIN EN ISO 527-2 (according to standard Volkswagen specification TL 524 35). The elongation $\epsilon$ is the length variation $\Delta L = L - L_0$ in mm, related to the original measuring length $L_0$ in $$mm\varepsilon = \frac{\Delta L}{L_0}$$

and is expressed as percentage (see already quoted Kunststoff-Komendium, Vogel-Verlag, 1988, page 239 "characteristic values"). The elongation at break $\varepsilon_R$ is the elongation at the moment at break.

In the following table 6 the withdrawal speeds during the tube extrusion and the results of the elongation at break measurement are shown.

TABLE 6

Elongation at break as a function of the withdrawal speed
Pipes 8 * 1 mm (8 mm outer diameter, 1 mm wall thickness)

| | withdrawal speed [m/min] | elongation at break [%] |
|---|---|---|
| VB1 | 20 | 165 |
| VB1 | 40 | 130 |
| VB1 | 60 | 110 |
| B1 | 20 | 210 |
| B1 | 40 | 230 |
| B1 | 60 | 250 |

The obtained results of the comparative examples already show at an extrusion speed of 20 m/min that the elongation at break specification according to VOLKSWAGEN TL 524 35, in which an elongation at break of >200% is required, is not reached. However, all examples according to the invention fulfill this requirement, even without problems at increased speeds.

By the way, all comparative examples and examples according to the invention pass the cold impact test according to VOLKSWAGEN TL 524 35.

The test results of table 6 show in a convincing way, how the quality of the respective multi-layer composites can be significantly improved with the present invention, i.e. the respective outer layer composition, and how the productivity and/or the output of an extrusion apparatus can thereby additionally be enormously increased. Thus, the invention allows a large increase of economic efficiency during the production of multi-layer tubes.

The following tests were accomplished at the tubing assemblies B2-B9 and VB2-VB4 described in table 5:

Cold impact test according to SAE J2260 paragraph 7.5 as well as bursting pressure according to paragraph 7.1.

Zinc chloride test: Test according to SAE J2260 paragraph 7.5, resistance to zinc chloride, respective Ford WSS-M 98D33-A3 paragraph 3.4.5, resistance to zinc chloride.

Sour gas test: Test according to SAE J2260 paragraph 7.8, auto-oxidised gasoline (cold impact (−40° C.) after storage PN90 1000 h at 40° C.).

Resistance to elution: Test according to VOLKSWAGEN TL52435, paragraph 6.

Examination of the resistance to elution of a multi-layer tube after storage FAM B (72 h/60° C.). The test medium FAM B must not contain flocculation or turbidity after storage.

In the following table 7 the results of the cold impact tests, sour gas tests, zinc chloride tests and the resistance to elution are illustrated. + means that the test has been passed, − stands for failure in the test.

TABLE 7

Test results
Pipes 8 * 1 mm (8 mm outer diameter, 1 mm wall thickness)

| | cold impact [% breakage], 0% required | SAE resistance to $ZnCl_2$ | SAE resistance to sour gas | resistance to elution |
|---|---|---|---|---|
| VB2 | − | − | − | − |
| VB3 | + | + | + | − |
| VB4 | + | + | + | − |
| B2 | + | + | + | + |
| B3 | + | + | + | + |
| B4 | + | + | + | + |
| B5 | + | + | + | + |
| B6 | + | + | + | + |
| B7 | + | + | + | + |
| B8 | + | + | + | + |
| B9 | + | + | + | + |

The table 7 illustrates that examples 2-9 successfully pass all tests and thus are also set apart from the solutions known in the state of the art by the resistance to elution as well as the resistance to sour gas.

What is claimed is:

1. Multi-layer composite in form of an extruded hollow section, comprising a thermoplastic outer layer and at least one further layer, wherein:
   the outer layer is formed by a mixture based on
   (A) 80 to 20 parts by weight of polyamide 12 and
   (B) 20 to 80 parts by weight of polyamide elastomer (TPE-A), wherein the polyamide elastomer (TPE-A) is polyamide 6 polyether amide, with polyamide 6 hard blocks and polyether inserted as flexible soft blocks,
   wherein the polyether has a backbone consisting of polypropylene glycol (PPG) with amino terminal groups;
   the mixture further comprises an impact modifier acting as a compatibilizer in an amount of 12 to 25 wt.-% based on the weight of the total molding material;
   and wherein the hollow section has been produced at extrusion speeds of over 20 m/min, so that the produced hollow section has an elongation at break of over 200% wherein the elongation at break is measured at the finished hollow section according to DIN EN ISO 527-2.

2. Multi-layer composite according to claim 1 in form of an extruded hollow section for the automotive sector.

3. Multi-layer composite according to claim 1, wherein the further layer is a barrier layer.

4. Multi-layer composite according to claim 3, wherein the hollow section has the form of a tube adapted for the passage of a liquid therethrough.

5. Multi-layer composite according to claim 1, further comprising one or more inner or intermediate layers.

6. Multi-layer composite according to claim 1, characterized in, that the hollow section is a multi-layer tube or a multi-layer hose.

7. Multi-layer composite according to claim 1, characterized in, that the hollow section has at least partly corrugated regions and is a multi-layer corrugated tube or tube with corrugated tube segments.

8. Multi-layer composite according to claim 1, characterized in, that the mixture, comprising the components polyamide 12 and TPE-A (B), further comprises one or more additives, selected from the group consisting of plasticizers, pigments, fillers, heat and light stabilizers, reinforcements, or mixtures thereof.

9. Multi-layer composite according to claim 1, characterized in, that the weight ratio of the components polyamide 12 to TPE-A (B) in the mixture of the outer layer is 1:1 or about 1:1.

10. Multi-layer composite according to claim 3, characterized in, that the at least one barrier layer is formed from materials based on ethylene vinyl alcohol copolymers (EVOH), or based on fluoro polymers, or polyphenylene sulfides, or liquid-crystalline polyesters, or partly aromatic polyamides, or partly aromatic polyesters, or metals.

11. Multi-layer composite according to claim 10, characterized in, that the barrier layer based on ethylene vinyl alcohol copolymers (EVOH) comprises at least 80 wt.-% ethylene vinyl alcohol copolymers (EVOH).

12. Multi-layer composite according to claim 11, characterized in, that the barrier layer based on ethylene vinyl alcohol copolymers (EVOH) comprises up to 20 wt.-% flexibilizing polymers.

13. Multi-layer composite according to claim 3, characterized in, that it further comprises a polyamide inner layer, which is formed directly adjacent to the barrier layer and abuts directly on an inner space formed by the hollow body, wherein the inner layer is formed based on polyamide selected from the group consisting of polyamide 6, polyamide 66, polyamide 69, polyamide 9, polyamide 10, polyamide 11, polyamide 12, polyamide 610, polyamide 611, polyamide 612, polyamide 613, polyamide 614, polyamide 618, polyamide 1211, polyamide 1010, polyamide 1212, polyamide 1012 and mixtures thereof.

14. Multi-layer composite according to claim 13, characterized in, that the inner layer is formed of polyamide 610 or polyamide 612 or a mixture of polyamide 610 and polyamide 6 and/or polyamide elastomers with polyamide 6 hard segments.

15. Multi-layer composite according to claim 13, characterized in, that either the inner layer is equipped antistatically or a further internal conductively equipped inner layer is provided and formed directly adjacent to the inner layer and abuts on an inner space formed by the hollow section.

16. Multi-layer composite according to claim 13, characterized in, that the inner layer comprises a plasticizer in an amount from 5 to 20 wt.-%, based on the weight of the total molding material.

17. Multi-layer composite according to claim 16, characterized in, that the barrier layer is formed based on ethylene vinyl alcohol copolymer (EVOH) or based on fluoro polymers, or polyphenylene sulfides, or liquid-crystalline polyesters, or partly aromatic polyamides, or partly-aromatic polyesters.

18. Method for producing a multilayered hollow section according to claim 1, characterized in, that the outer layer as well as the further layers are joined to a hollow section in a continuous procedure, a coating procedure, or a tandem extrusion.

19. In a motor vehicle having a multi-layer tube or multi-layer hose as a fuel tube, brake air line, compressed air line, hydraulic line, clutch line or cooling line, the improvement wherein said multi-layer tube or hose is according to claim 4.

20. Multi-layer composite according to claim 4, wherein the tube is a fuel tube for liquid fuels.

21. Multi-layer composite according to claim 5, wherein the one or more inner or intermediate layers are conductively formed or improve adhesion of the individual layers to each other.

22. Multi-layer composite according to claim 8, characterized in that the impact modifier is an acid-modified ethylene/α-olefin copolymer.

23. Multi-layer composite according to claim 12, characterized in that the flexibilizing polymers are selected from the group, consisting of copolyamide 6/12 and ethylene vinyl acetate copolymer (EVA).

24. Multi-layer composite according to claim 13, characterized in that the inner layer is formed based on polyamide 610 or polyamide 612 or a mixture of polyamide 6 and polyamide 12 and an impact modifier acting as a compatibilizer.

25. Multi-layer composite according to claim 13, characterized in that the inner layer comprises an impact modifier in an amount of 8 to 30 wt.-% based on the weight of the total molding material.

26. Multi-layer composite according to claim 16, characterized in that the inner layer comprises a plasticizer in an amount from 10 to 15 wt.-%, based on the weight of the total molding material.

27. Method for producing a multilayered hollow section according to claim 18, wherein the multilayered hollow section is a tube or a hose.

28. Method for producing a multilayered hollow section according to claim 18, characterized in that the continuous procedure is a coextrusion procedure.

29. Method for producing a multilayered hollow section according to claim 18, characterized in that corrugations are applied.

30. Method for producing a multilayered hollow section according to claim 29, characterized in that the application of corrugations is followed by a thermal shaping step.

* * * * *